Aug. 30, 1960  W. E. VOSS  2,950,898
CONTROL VALVE
Filed July 1, 1957
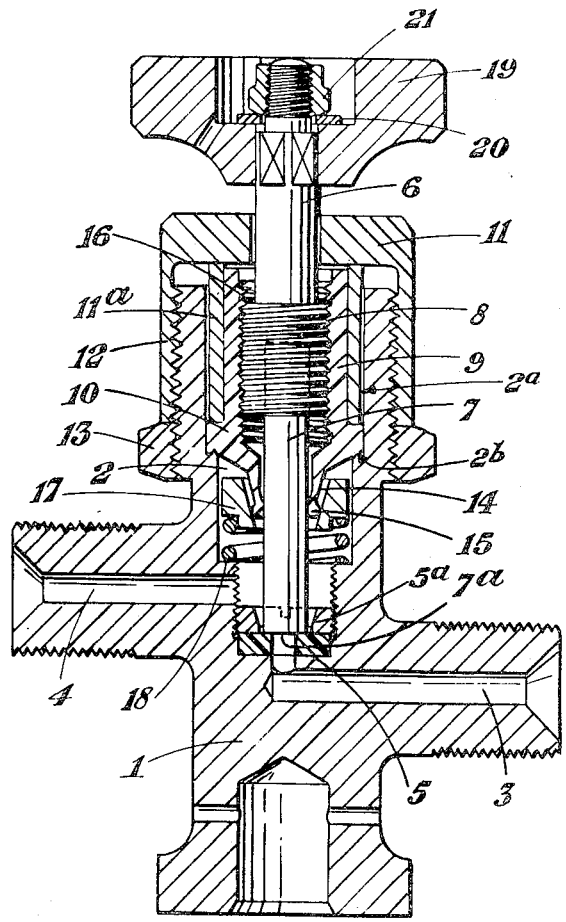
Inventor:
Waldemar Emil Voss
By his attorneys:
Baldwin & Wight United States Patent Office 2,950,898
Patented Aug. 30, 1960

2,950,898

CONTROL VALVE

Waldemar Emil Voss, Kenton, England, assignor, by mesne assignments, to L. Adams Limited, London, England, a corporation of the United Kingdom Filed July 1, 1957, Ser. No. 669,270

3 Claims. (Cl. 251—214)

This invention relates to control valves for use in pressure fluid systems, more especially for use in conjunction with compressed gaseous oxygen supply systems, such as are used in respiration aids in aviation, mountaineering and surgery, and is an improvement in or modification of the valve described and claimed in co-pending U.S. application Serial No. 493,403, filed March 10, 1955, now U.S. Patent No. 2,805,040, dated September 3, 1957. In the said specification there is described a valve having improved ease of operation, reduction in weight, elimination of added lubricant, extended life and increased resistance to wear and improved sealing both in the fully open and closed positions and in all intermediate positions, in particular when both the inlet and outlet connections of the valve device are connected to a system at a pressure greater than atmospheric pressure.

The valve disclosed in Patent No. 2,805,040 includes a valve body having a main bore therein and inlet and outlet ports in communication with said main bore; a valve element positioned in said main bore and terminating at one end in a hemispherical nose; a male-threaded operating spindle connected to the other end of said valve element and extending through one end of said main bore, the other end of said main bore having a conical seating surface on which the hemispherical nose of said valve element may seat to seal said outlet passage; an internally bored tapered gland member of diminishing thickness positioned in said main bore and receiving said operating spindle, said gland member having threads to engage the threads on said spindle; and an annular thrust member concentrically positioned in said main bore and having a conical seating surface in which the diminished thickness end of said tapered gland member seats to provide a leak-proof joint between said valve spindle and the wall of said main bore.

The tapered gland member is continuously maintained in close contact with the spindle by spring loading the thrust member, which is formed with a tapered bore, so as to be located in line contact around the tapering gland member and to compress said member inwardly to grip the valve spindle under pressure exerted by the spring through the thrust member. To assist in this, the lower end of the gland member terminates in a rounded flange.

The gland member is formed as a freely fitting sleeve insert in the valve body, and is locked against rotation and sealed to said body, adjacent the top thereof, through an integral flange compressed onto a seating in the valve body, by means of a clamping nut screwing onto the valve body and concentric with the valve spindle.

As particularly described in the said specification, the valve body is made of a light metal or light metal alloy, for example aluminium or aluminium alloy, whilst the gland member is made from a slightly resilient synthetic material such as nylon, which requires no lubricant for the mating screw thread of the valve spindle and which will maintain a gland seal around the spindle without increasing the operating torque excessively. The thrust member is made of harder material than the gland, such as aluminium alloy, and is relatively non-resilient, whilst, in order to minimise wear between the valve seat and valve element nose, one of the two is preferably made of slightly resilient material relative to the other, for example the nose of the valve element may be formed of an unplasticised acrylic resin which may conveniently have a hemispherical contour, while the valve seat may conveniently be formed in the metal valve body with a concave truncated conical contour. The valve spindle is made of stainless steel to render it resistant to corrosion and wear. The thrust member is conveniently spring loaded against the rounded flange of the gland member surrounding the valve spindle by means of a compression spring fitted in a recess in the valve body and concentric with the valve spindle.

It has now been found that a valve constructed in accordance with the description in my said specification is liable to lose some of its efficiency due to misuse; thus the gland member is provided with a top seal flange which may allow a large area over which gaseous pressure can act detrimentally, especially if the valve is used in a surrounding temperature in excess of 60° C., whilst excessive force applied to the valve spindle on closing the valve has been found to cause some deflection of the hemispherical nose, and even in extreme cases to fracture the nose. In either case, repair of the valve is not a simple matter, as it may necessitate dismantling of the whole valve and replacement of the valve element and even the seat in the bore of the valve body.

According to this invention the gland member is sealed in the valve body by a lower or bottom seal flange, thereby reducing the area over which the gaseous pressure can act.

Preferably the lower flange seal of the gland member is locked against rotation and sealed to the valve body through the intermediary of a loose sleeve insert maintained in position by a clamping nut.

Preferably also the operative surface of the valve element is flat and co-acts with a flat seating of nylon positioned in the valve body bore between the inlet and outlet ports.

A valve according to this invention for use in controlling flow of compressed gaseous oxygen, is illustrated in vertical section in the accompanying drawing, referring to which there is provided a valve body 1 of aluminium or aluminium alloy, which is bored centrally as at 2, and has two further bores forming passages at right angles to the main bore 2, one of said secondary bores forming an inlet port or passage 3, and the other an outlet port or passage 4. Where the inlet passage 3 communicates with the central bore 2, the body 1 is formed with a flat surface on which is positioned a seating or washer 5, with which the valve element is adapted to co-operate. The seating 5 is formed of slightly resilient synthetic material, e.g. nylon and is held in place on the aforesaid flat surface by a retainer 5ª threaded into a reduced diameter bottom portion of the bore 2. Said valve element comprises a valve spindle 6 of stainless steel, terminating in a rod 7 having a flat operative surface or seat engageable portion 7ª, formed of metal, such as steel, which surface 7ª is adapted to co-operate with the seating 5.

The valve spindle 6 is formed with a male thread 8 for connection with a female thread on a gland member 9, formed of nylon. The said member 9 is a free fit in the relatively small diameter main bore 2 of the valve body with its outer surface spaced inwardly from the bore 2. The valve body is formed with a relatively large diameter counterbore 2ª providing a shoulder 2ᵇ between the main bore and the counterbore. The major part of the gland member 9 extends within the counterbore, the gland member being sealed to the valve body 1 by a clamping nut 11, e.g. of light alloy, which screws onto a thread 12 on the valve body 1 to clamp a loose sleeve insert 11ᵃ against the flange 10 and thus clamp the latter against the shoulder 2ᵇ of the valve body. The nut 11 is held in clamping position by a lock nut 13.

The nylon gland member 9 is bored out to receive a female thread for engagement by the thread 8 on the valve spindle 6, whilst the lower end of the gland member is tapered as at 14 and terminates in a rounded flange 15, the whole gland member including the tapered portion 14, flange 15, threaded bore and flange 10 forming one component.

The top of the screw thread on the valve spindle 6 is protected by a stainless steel washer 16 which forms a stop for the valve spindle in the fully open position against the lower surface of the clamping nut 11.

A thrust member 17, e.g. of hard aluminium or aluminium alloy, is provided as a free fit within the main bore 2 of the valve body 1 and is formed with an internal tapered bore, such as to provide free location of the thrust member on the rounded flange 15 of the nylon gland member 9, with a line contact between said thrust member and flange, thereby giving an equal closing pressure all round the gland member onto the valve spindle. At the lower end, the tapered bore of the thrust member is clear of the valve spindle, which passes through it.

The thrust member 17 is at all times maintained in pressure contact with the rounded flange 15 of the nylon gland member 9 by a compression spring 18, which presses the thrust member 17 upwards and tends thereby to compress the said flange and tapering wall of the nylon gland member inwards to grip the valve spindle.

The upper end of the valve spindle 6 receives an operating knob 19 which is retained in position by a washer 20 locked by a nut 21 on the end of said spindle.

The valve operates in the following manner:

When a supply of oxygen through the valve is desired, the operating knob 19 is rotated in a counterclockwise direction, thus drawing the end 7ᵃ of the spindle 7 off its nylon seating 5, when compressed oxygen can pass from the inlet port through the inlet passage 3, past the valve element, to the outlet passage and port 4. Reverse rotation of the knob will, of course, re-seat the valve and seal the inlet.

In all positions of the valve spindle from the closed position (as shown) when the surface 7ᵃ is forced into contact with the seating 5, to the fully open position when the washer 16 comes into contact with the lower surface of the clamping nut 11, thereby preventing further counterclockwise rotation of the knob and valve spindle screw thread, leakage past the valve spindle is prevented by the tapered nylon gland member which is compressed around the valve spindle by pressure from the compression spring 18 applied through the thrust member 17.

When the valve element is on its seating 5, the reaction between the male screw thread 8 of the valve spindle 6 and its mating female thread in the nylon gland member 9 will normally tend to lift the lower end of the nylon gland member upwards from contact with the thrust member 15. This tendency is overcome by the compression spring 18 which makes good the reaction by expanding to main the thrust member in contact with the rounded flange 15 of the nylon gland member 9. In the fully open position, when the washer 16 bears against the under surface of the clamping nut 11 and the reaction between the valve spindle 6 and nylon gland member screw threads is in the opposite direction, the sealing of the valve spindle is assisted by slight additional compression of the spring transmitted by downward movement of the lower end of the nylon gland member into the thrust member.

With such a construction it will be apparent that, if, during operation of the valve, undue force is used to close the valve, enormous forces are imposed on the valve seating; should the seating be damaged, the said seating can easily and economically be replaced.

What is claimed is:

1. A control valve device comprising a valve body having a bore of relatively small diameter and a counterbore of relatively large diameter providing a shoulder between said bore and said counterbore; inlet and outlet passages communicable with said bore; a valve seat in said body between said passages for controlling communication of said passages through said bore; an internally threaded gland member in said valve body, the major part of said gland member being within said counterbore with its outer surface spaced inwardly from said counterbore; an external flange on said gland member engaging said shoulder; a sleeve extending freely in the space between said counterbore and the outer surface of said gland member; means for clamping said sleeve against said flange and thereby clamping said flange against said shoulder to seal the joint between said flange and said shoulder and thereby prevent leakage of fluid from said bore into the space between said counterbore and the outer surface of said gland member therein; a valve spindle having an externally threaded portion in threaded engagement with the internal threads of said gland member and having a surface portion engageable with said seat; and sealing means on said gland member located axially of said valve spindle between said gland member external flange and said valve spindle seat, and surrounding and having sealing engagement with said valve spindle between said seat engageable surface portion and threaded portion thereof.

2. A control valve device according to claim 1 in which said sealing means has an inwardly tapered portion extending into said bore and surrounding said spindle in sealing relation thereto, said device including an annular thrust member positioned within said bore and having a conical seating surface engaging the smaller end of said gland member tapered portion; and means for forcing said thrust member against said tapered portion to exert closing pressure around the latter and provide a seal between said tapered portion and said spindle.

3. A control valve device comprising a valve body of relatively low resilience having a bore of relatively small diameter and a counterbore of relatively large diameter providing a shoulder between said bore and said counterbore; inlet and outlet passages communicable with said bore; a valve seat in said body between said passages for controlling communication of said passages through said bore; an internally threaded gland member of relatively high resilience in said valve body, the major part of said gland member being within said counterbore with its outer surface spaced inwardly from said counterbore; an external flange on said gland member engaging said shoulder; a sleeve extending freely in the space between said counterbore and the outer surface of said gland member; means for clamping said sleeve against said flange and thereby clamping said flange against said shoulder to seal the joint between said flange and said shoulder and thereby prevent leakage of fluid from said bore into the space between said counterbore and the outer surface of said gland member therein; a valve spindle having an externally threaded portion in threaded engagement with the internal threads of said gland member and having a surface portion engageable with said seat; and sealing means on said gland member located axially of said valve spindle between said gland member external flange and said valve spindle seat, and surrounding and having sealing engagement with said valve spindle between said seat engageable surface portion and threaded portion thereof.

References Cited in the file of this patent

UNITED STATES PATENTS

| | | |
|---|---|---|
| 1,380,527 | Carr | June 7, 1921 |
| 1,481,776 | Rich | Jan. 22, 1924 |
| 2,805,040 | Voss | Sept. 3, 1957 |